United States Patent [19]
Harding et al.

[11] Patent Number: 5,958,470
[45] Date of Patent: Sep. 28, 1999

[54] VACUUM FORMING APPARATUS FOR FORMING A THREE-DIMENSIONAL SURFACE ARTICLE

[75] Inventors: Glenn T. Harding, Agincourt; William D. Harding, Unionville; William Liddle, Ajax, all of Canada

[73] Assignee: Hallmark Cards, Incorporated, Kansas City, Mo.

[21] Appl. No.: 08/842,332

[22] Filed: Apr. 23, 1997

Related U.S. Application Data

[62] Division of application No. 08/618,401, Mar. 19, 1996, Pat. No. 5,667,747, which is a continuation of application No. 08/408,900, Mar. 22, 1995, abandoned.

[51] Int. Cl.⁶ .......................... B29C 51/10; B29C 51/42
[52] U.S. Cl. ........................................ 425/384; 425/388
[58] Field of Search ..................... 425/384, 388

[56] References Cited

U.S. PATENT DOCUMENTS

| | | | |
|---|---|---|---|
| 2,765,493 | 10/1956 | Winstead | 264/553 |
| 3,010,152 | 11/1961 | Braund | 264/554 |
| 3,553,784 | 1/1971 | Shuman | 425/384 |
| 3,562,859 | 2/1971 | McIntyre | 425/384 |
| 3,873,342 | 3/1975 | Ellison | 428/13 |
| 3,880,686 | 4/1975 | Robinson | 156/59 |
| 4,009,981 | 3/1977 | Rosen | 425/384 |
| 4,163,813 | 8/1979 | Sheets et al. | 427/198 |
| 5,286,558 | 2/1994 | Seo et al. | 428/304.4 |
| 5,314,370 | 5/1994 | Flint | 446/391 |
| 5,362,436 | 11/1994 | Wagner | 264/553 |
| 5,473,159 | 12/1995 | Krieger | 250/318 |
| 5,620,715 | 4/1997 | Hart et al. | 425/384 |
| 5,667,747 | 9/1997 | Harding et al. | 264/510 |

FOREIGN PATENT DOCUMENTS

| | | |
|---|---|---|
| 0 658 447 | 6/1995 | European Pat. Off. . |
| 2 678 552 | 1/1993 | France . |
| 1161991 | 8/1969 | United Kingdom . |
| 1454786 | 11/1976 | United Kingdom . |
| 2060375 | 5/1981 | United Kingdom . |
| 2281535 | 3/1995 | United Kingdom . |
| WO 91/09743 | 7/1991 | WIPO . |
| WO 96/29189 | 9/1996 | WIPO . |

*Primary Examiner*—Robert Davis
*Attorney, Agent, or Firm*—Leydig, Voit & Mayer, Ltd.

[57] ABSTRACT

A vacuum forming process and related apparatus are disclosed. The vacuum forming process and apparatus can be used for molding a thin sheet of thermoformable plastic into an accurate three-dimensional relief reproduction of an original artwork such that the plastic sheet carries a permanent image of the original work.

10 Claims, 10 Drawing Sheets

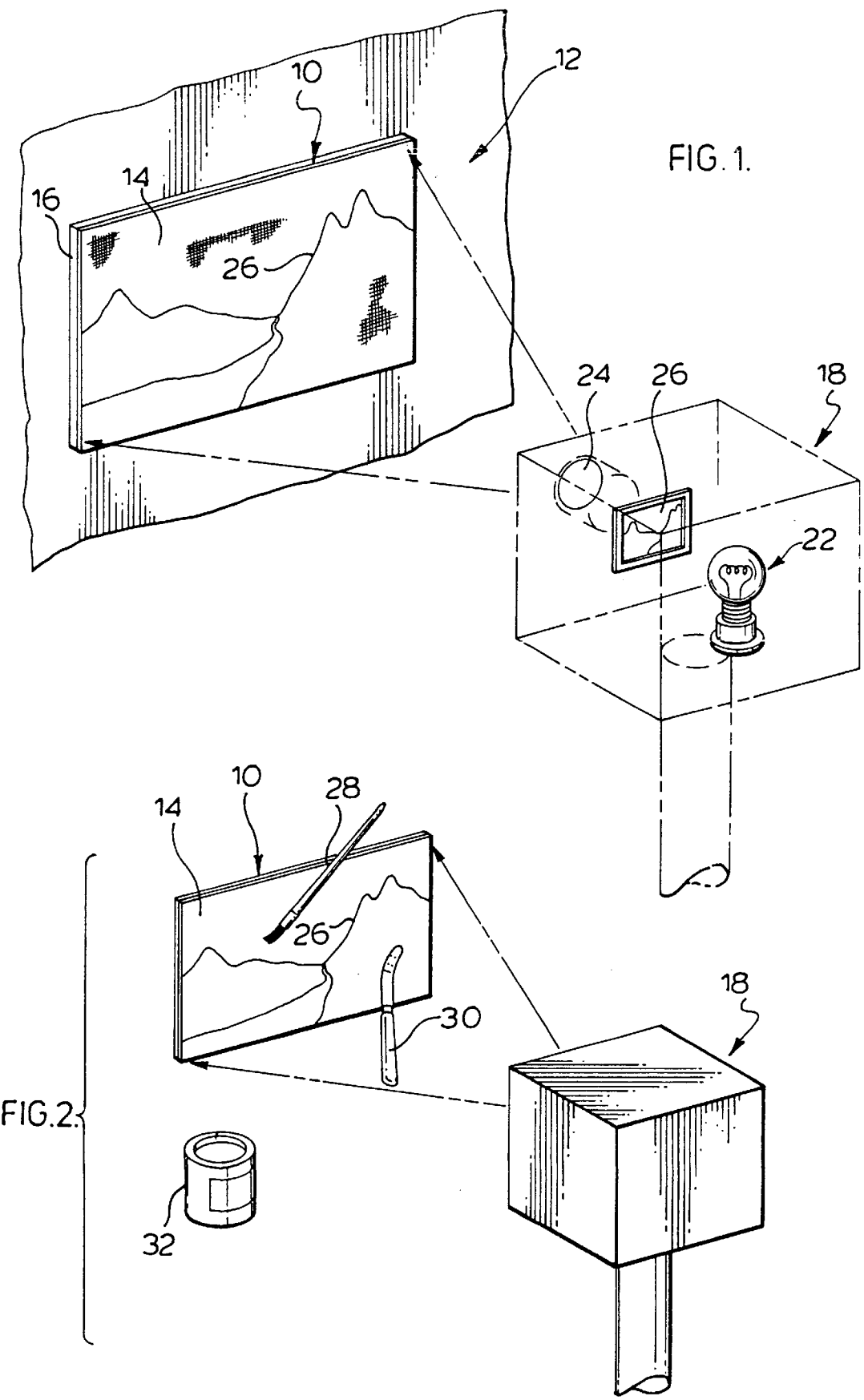

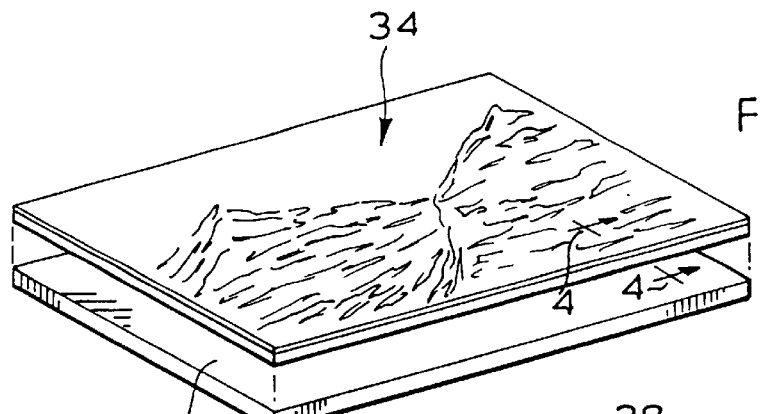
FIG. 3.
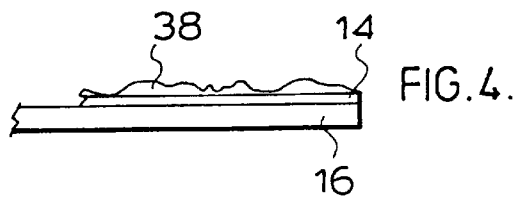
FIG. 4.
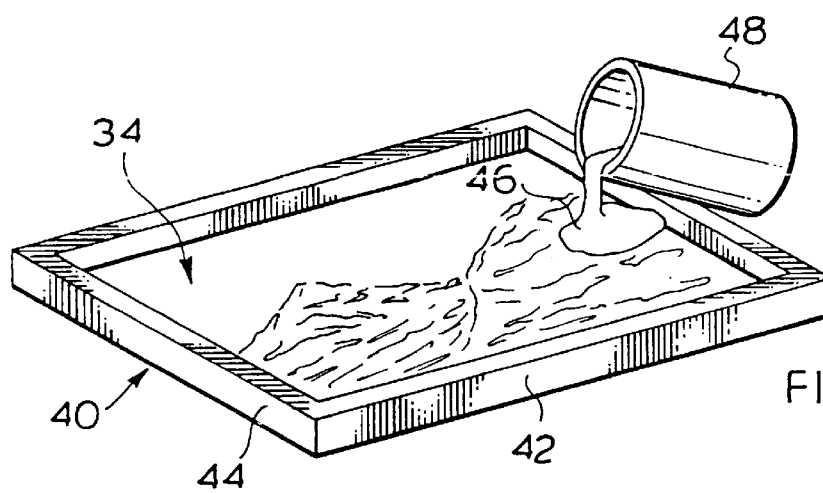
FIG. 5.
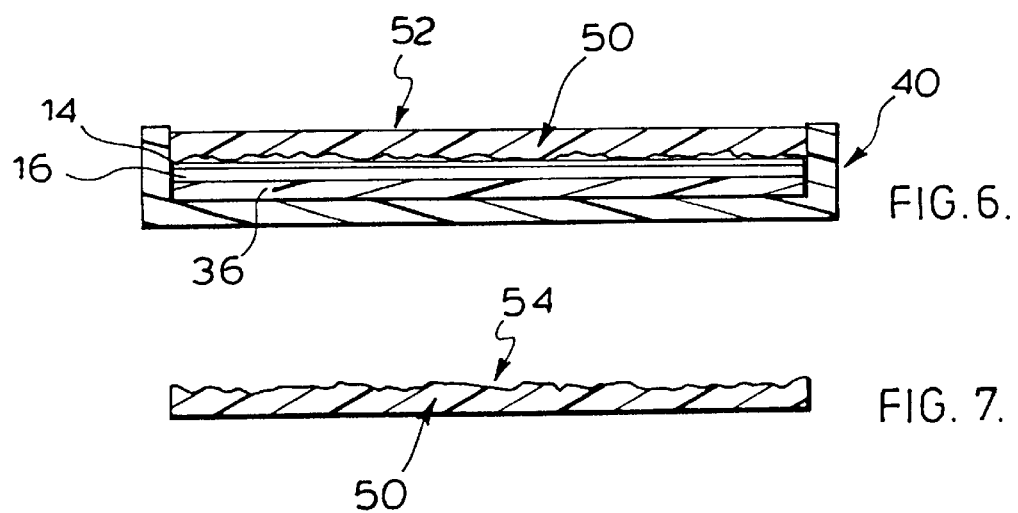
FIG. 6.
FIG. 7.

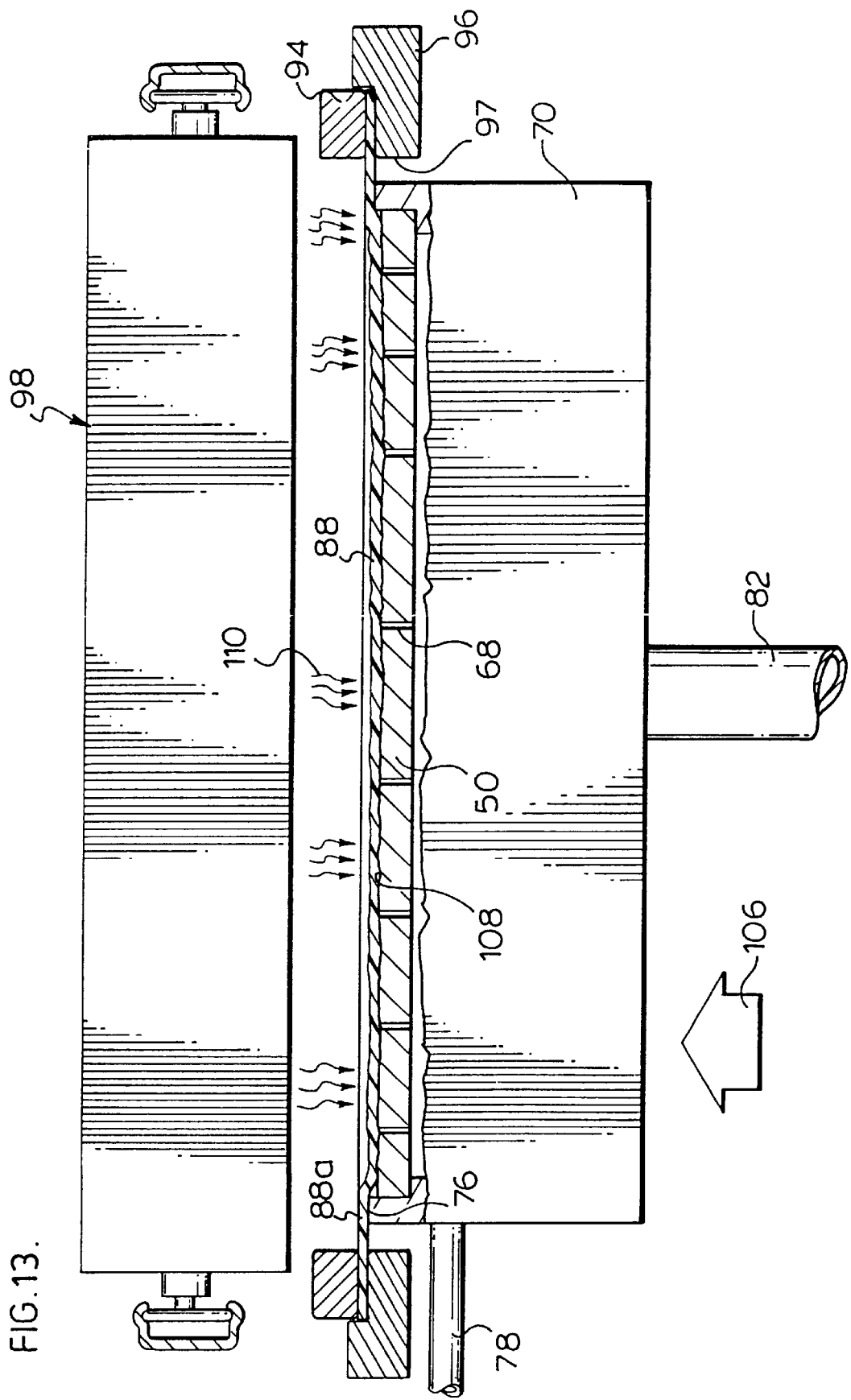

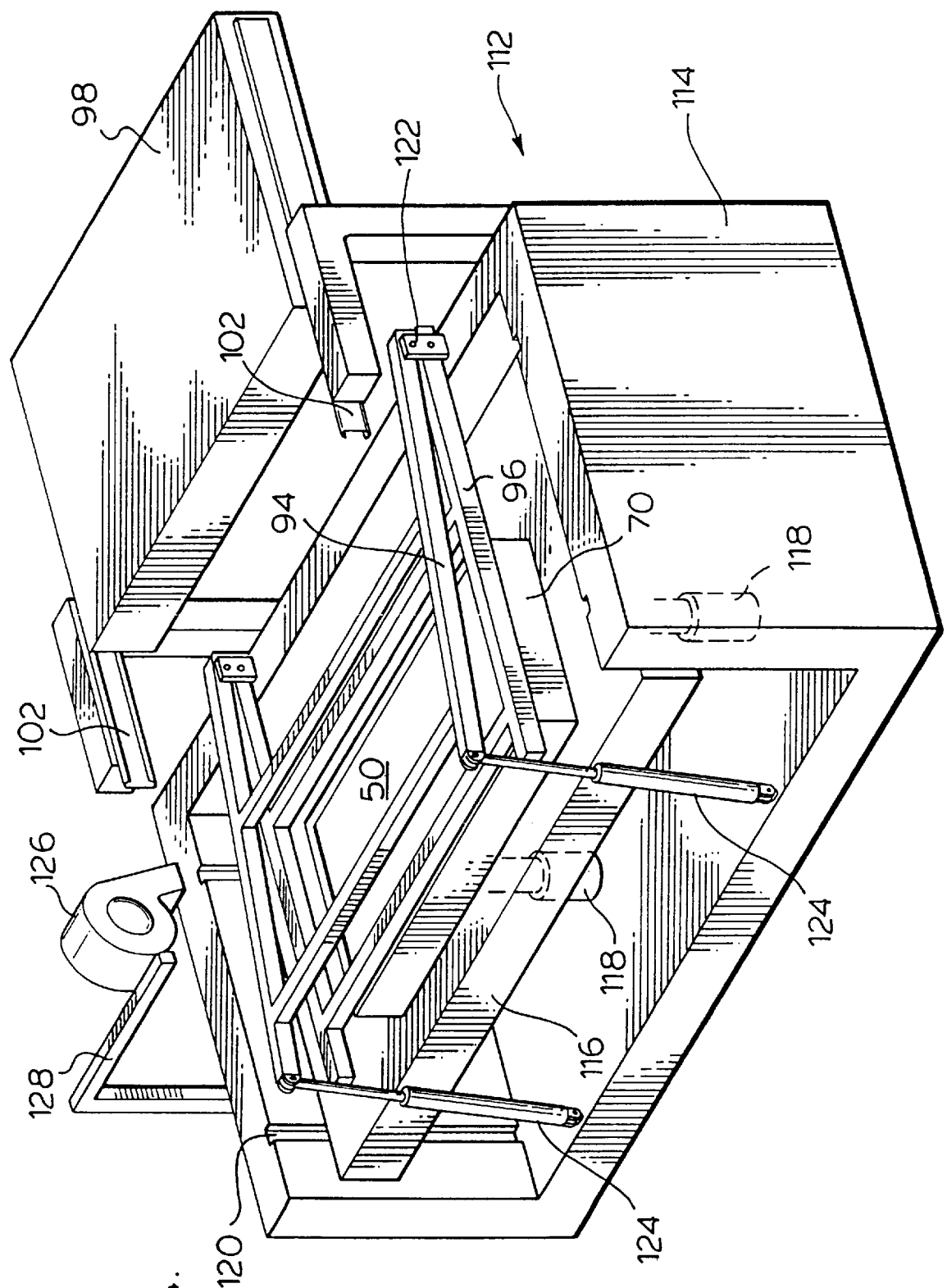

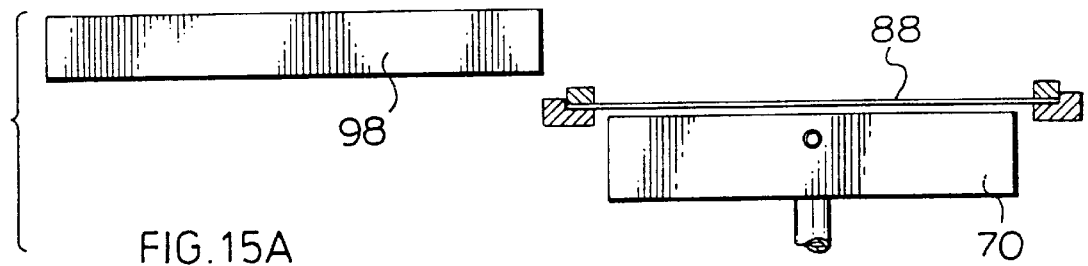
FIG.15A
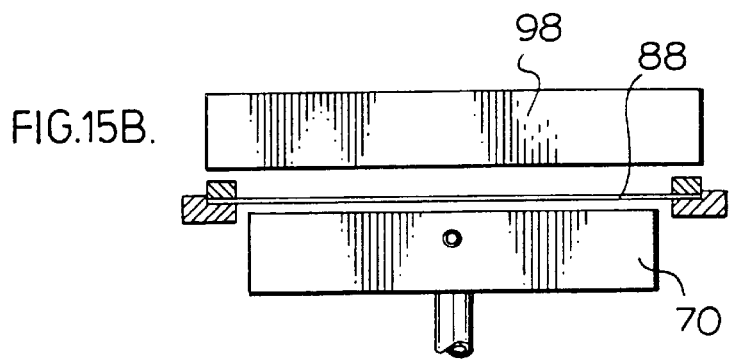
FIG.15B.
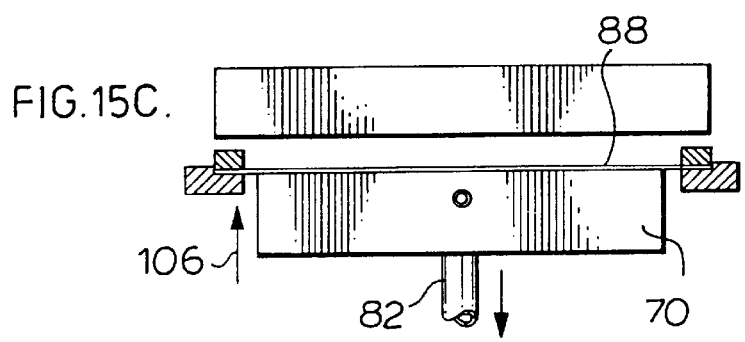
FIG.15C.
FIG.16.
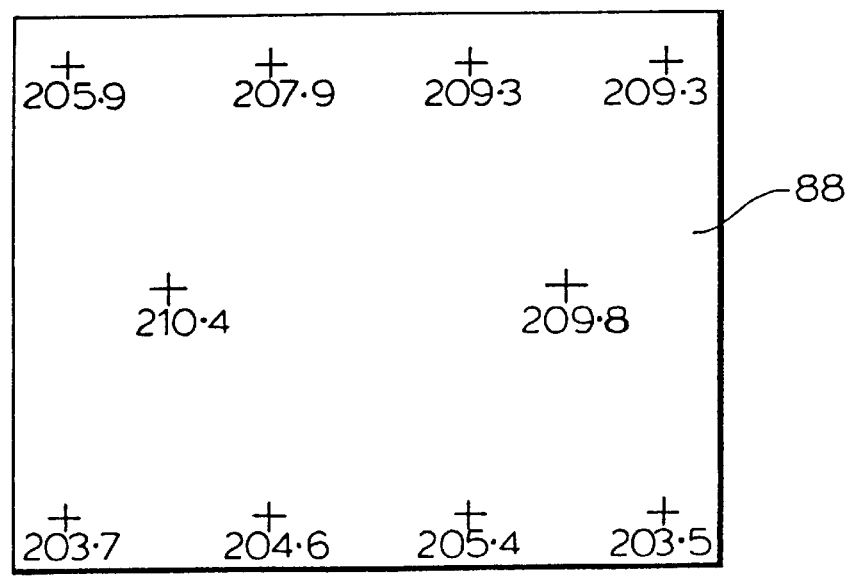

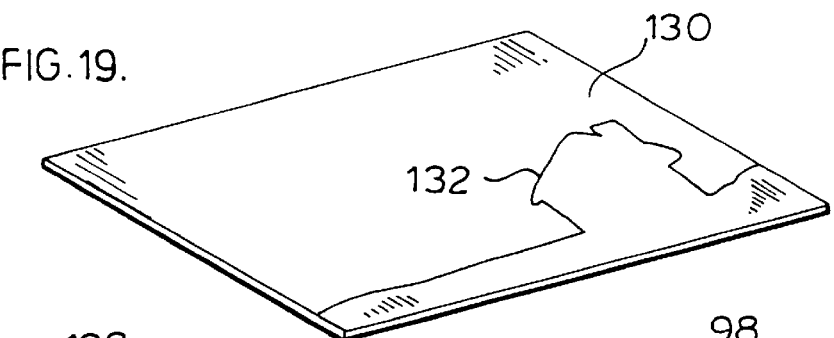
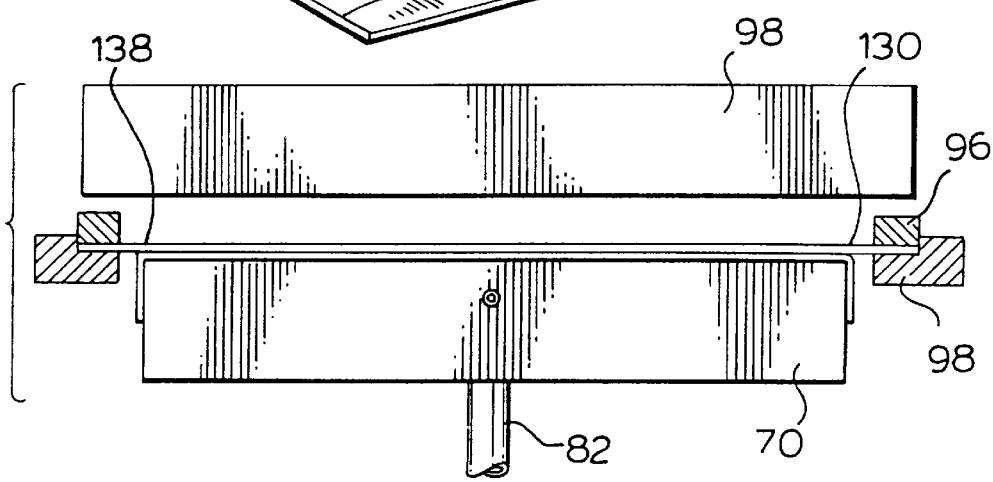
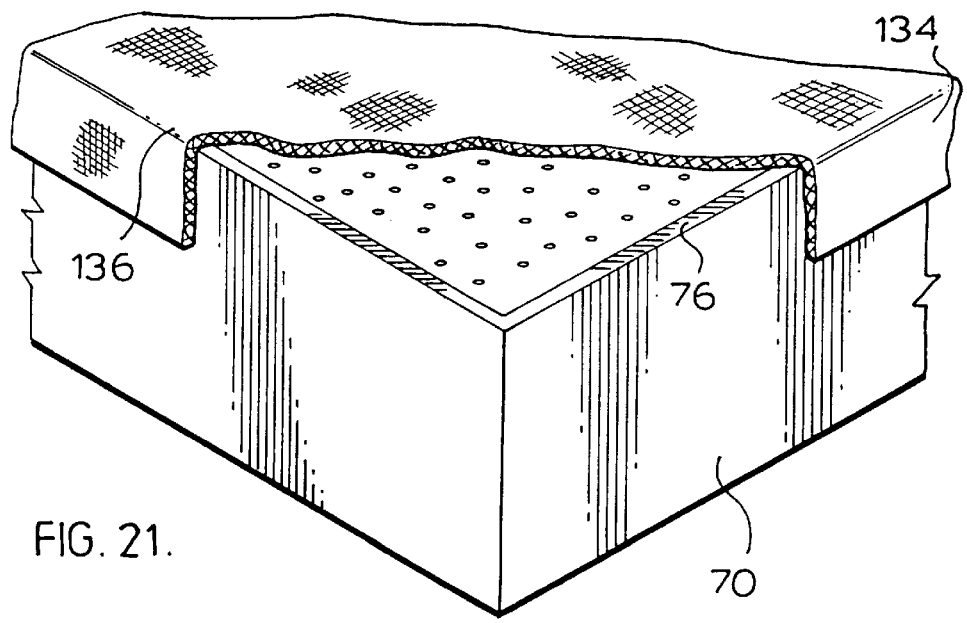

VACUUM FORMING APPARATUS FOR FORMING A THREE-DIMENSIONAL SURFACE ARTICLE

This application is a divisional of application Ser. No. 08/618,401, filed Mar. 19, 1996 and now U.S. Pat. No. 5,667,747, which is a File Wrapper Continuation of Ser. No. 08/408,900, filed Mar. 22, 1995 and now abandoned.

FIELD OF THE INVENTION

This invention relates to a vacuum forming process and related apparatus for molding a thin sheet of thermoformable plastic into an accurate three-dimensional relief reproduction of an original artistic work where the plastic sheet carries a permanent image of the original work.

BACKGROUND OF THE INVENTION

Society's renewed interest in works of arts has resulted in the demand for inexpensive reproductions of the original. For many years, society had to contend with two dimensional reproductions which were most often reproduced by a photographic process. These two dimensional reproductions failed to reproduce what was often an essential characteristic of the work, the relief. For some paintings, for example, part of the genius of the work not only lies in the image produced but in the texture of the work such as the brush stroke, which, for example, may reflect light in a particular manner.

One of the first obstacles to achieving this goal is the manner in which the third dimension of the art work can be reproduced. Various methods have been set forth in order to recreate that third dimension, however, some of those methods involve making a matrix from the original work itself pouring a substance over the original work to copy its relief; (U.S. Pat. Nos. 4,285,744; 4,971,743; French Patents 1,493, 516 and 1,548,337). Unfortunately, this procedure is simply not acceptable when reproducing originals as it may jeopardize the physical integrity of the work and with masterpieces they are simply not available for use.

From the matrix a female and possibly a male molding die is made. These dies constitute the molds against which the image carrying substrate will be pressed. The molding may be accomplished by a press, a vacuum or other devices which exert pressure on the substrate.

The problem encountered in pressing the substrate consists of finding a medium capable of adequately reflecting the definition sought. It has been found that PVC is a medium which can be properly deformed under controlled conditions. Unfortunately, this material must be heated prior to pressing and this often leads to displacements and distortions of the image contained on it.

Traditional processes have attempted to deal with the above problems in the following manner. Canadian patent application 2,020,206 and its U.S. counterparts 5,182,063 and 5,201,548 put forth an alternative method for forming a matrix which reflects the three dimensional features of the work of art, without jeopardizing the original work. A similar approach is also described in U.S. Pat. No. 4,001, 062. Two photographs of the original work are taken, and are put side by side on a carrier. The transparent substrate, upon which the three dimensional elements will be reproduced, is placed over one of the images. An artist then begins recreating the relief (for instance, the brush strokes) by referring to the image underneath the substrate. When it becomes difficult to see the image beneath the substrate because it is covered with paste, then the artist may simply refer to the other image beside it. By having an artist reproduce the three dimensional elements of the original work on a matrix, and then forming the mold from that disposable matrix, the original work of art is never touched. On the other hand, one of the drawbacks of this procedure is that once the artist begins relying on the image beside the substrate, and not the one underneath, faithful reproduction of the relief becomes less accurate.

In order to ensure adequate definition during the pressing process, many prior approaches (U.S. Pat. Nos. 4,971,743; 5,116,562 and 4,285,744) require that the image carrier, which is most often a sheet of PVC, be heated to its softened state immediately prior to embossing. The PVC is usually heated to 110° C. to 130° C. As it is softened, the sheet of PVC bows over the female embossing die but does not come into contact with it. The press is then elevated so that the softened PVC fills all the notches and indentations of the die, and the pressure is then applied for the necessary amount of time. Unfortunately, the heating of the sheet of PVC to its softened state inevitably results in unequal softening, so that some sections of the PVC will soften more quickly than others and consequently, they will bow before others, which results in the displacement of the image. Therefore, the molded relief does not correspond with the image. In the process of U.S. Pat. No. 5,182,063, canvas is impregnated with a resinous material to form a substrate. The PVC sheet material with image is then melted and pressed against the substrate to bond the PVC sheet to the substrate. The pressing operation involves the use of dies which press the desired relieve into the PVC and substrate sandwich. Although the image appears to be stable on substrate, additional processing is required to ensure such stability.

For this reason, some inventions, such as U.S. Pat. No. 4,285,744, provide a means for molding a PVC substrate, while upholding the quality of the image, by heating it quickly to its softened state, by monitoring the distribution of the heat, and by subsequently cooling it rapidly. In other words, attempting to reduce the amount of time during which the PVC bows over the die. However, in light of the inherent structure of PVC, it is impossible to predict the manner in which it will soften, even if the heat is regulated.

The present invention in accordance with one aspect seeks to overcome the shortcomings of the prior art in the following manner. When recreating the three dimensional qualities of the original work of art on a matrix, this invention ensures that the image on the substrate remains visible at all times so that the artist does not have to make a calculated guess as to the placement of a particular relief. This is accomplished by projecting the image onto the substrate, either through the use of a standard photography lens enlarger or its equivalent. By projecting the image, the artist is always able to see the work regardless of the amount of paste covering the substrate which equally increases the reliability of the three dimensional reproduction.

Furthermore, prior to the pressing process, this invention does not require that the PVC be heated to such an extent that the sheet droops over the die, thus increasing the likelihood of distortion or displacement of the image in relation to the relief. Instead, the plastic sheet is heated to a first temperature immediately prior to molding and the temperature is increased further once the pressure of the vacuum is applied. In other words, the optimal temperature required for forming the plastic sheet is still achieved, however, this final softened state is achieved only once the plastic sheet is contained in the mold, at which point there does not remain any possibility of distortion or displacement of the image in relation to the relief.

The present invention uses vacuum as opposing to opposing presses, in order to apply the required pressure for molding the PVC. Although a vacuum forming machine may be less effective than opposing pressing of matting dies such as described in U.S. Pat. No. 4,285,744, this invention overcomes most of the shortcomings by allowing for the drilling of a multitude of minuscule holes into the female die, which will result in the increased effectiveness of the suction of the vacuum on the image carrier substrate, and consequently, this will result in increased definition of the relief embossed. Although U.S. Pat. No. 4,308,224 describes the use of microscopically small air channels in the die, they are for a completely different purpose to allow air to escape during the melting of the foil. The foil in its molten state takes on the shape of the mold as the molten foil flows into the mold and moves air out from beneath the foil through the air channels.

Although the process in accordance with this invention may not result in a three-dimensional reproduction that is as high quality as some of the other procedures, the method provides for a significant reduction in the production time.

SUMMARY OF THE INVENTION

In accordance with an aspect of the invention, a vacuum forming process for molding a thin sheet of thermoformable plastic, and an accurate three-dimensional relief reproduction of an original artwork, the sheet of plastic having printed on one side thereof a permanent image of the original artwork, the process comprises:

i) supporting the printed sheet of plastic proximate a vacuum forming female mold with the printed side facing the mold, the female mold having a surface relief therein which is a reproduction of the surface relief of the original artwork, the image being in register with the surface relief of the mold, a multitude of vacuum forming holes being provided in the mold;

ii) heating said plastic sheet;

iii) contacting the mold with the sheet once the sheet is heated to a first temperature which is below normal thermoforming temperatures where the first temperature minimizes movement of the image relative to the mold due to heating of the sheet, immediately applying a vacuum to the holes in the mold to commence drawing the plastic sheet into the mold and fix thereby the sheet relative to the mold relief to further minimize image movement, on the sheet relative to the mold;

iv) continuing to heat the plastic sheet while maintaining vacuum on the holes in the mold to complete forming of the three-dimensional relief in the sheet;

v) stop heating the plastic sheet once it has attained a second temperature in the range of normal thermoforming temperatures while continuing to apply vacuum to the mold holes, applying cooling to the sheet after heating is stopped to cool the sheet below the first temperature to a third temperature to render permanent the three-dimensional relief formed in the sheet, vi) stop cooling the sheet and remove the sheet from the mold.

In accordance with another aspect of the invention, an apparatus for vacuum forming a thin sheet of thermoformable plastic into an accurate three-dimensional relief reproduction of an original artwork, the sheet of plastic having printed on one side thereof a permanent image of the original artwork, the apparatus comprising:

i) a vacuum forming female mold having a surface relief therein which is a reproduction of the surface relief of the original artwork, a multitude of vacuum forming holes being provided in the mold;

ii) means for supporting the printed sheet of plastic proximate the mold with the printed side facing the mold, the support means supporting the image in register with the surface relief of the mold;

iii) means for heating the plastic sheet, the heating means being mounted on means for reciprocally moving the heating means from a first position away from the mold to a second position over and spaced from the unprinted side of the plastic sheet;

iv) means for relatively moving the plastic sheet and the mold to contact the plastic sheet with mold when the heating means in the second position heats the plastic sheet to a first temperature which is below normal thermoforming temperatures;

v) means for sealing a perimeter of the plastic sheet to a corresponding perimeter of the mold;

vi) means for applying a vacuum to the multitude of holes in the mold when the sealing means seals the plastic sheet and the plastic sheet is at the first temperature;

vii) the reciprocating means moving the heating means back to the second position when the plastic sheet is at a second thermoforming temperature;

viii) means for cooling the plastic sheet with the heating means in the second position;

ix) means for removing the vacuum from the multitude of holes when the plastic sheet is cooled by the cooling means to a third temperature, the sealing means releasing a seal between the mold and the plastic sheet to permit removal of the formed plastic sheet from the mold.

In accordance with another aspect of the invention, a method of producing a male mold for use in making a female mold which is used in vacuum forming a thermoformable plastic sheet to form an accurate three-dimensional relief reproduction of an original artwork, comprises:

i) mounting a substrate sheet;

ii) projecting an image of the original artwork onto the substrate sheet;

iii) applying a moldable compound to the substrate to replicate brush strokes of the original image where projection of the image onto the substrate guides application of the compound; and iv) allowing the compound to harden to provide the mold from which a female mold is made.

In accordance with another aspect of the invention, a method is provided for producing a male mold for use in making a female mold which is used in vacuum forming a thermoformable plastic sheet to form an accurate three-dimensional relief reproduction of an original artwork, the method comprises:

i) thermoforming a canvas relief in a thermoformable plastic sheet which has an image of the original artwork printed thereon;

ii) applying a moldable compound to the printed surface of the sheet to replicate over the image brush strokes of the original image, the printed image guiding application of the compound; and iii) allowing the compound to harden to provide the male mold from which a female mold may be made.

BRIEF DESCRIPTION OF THE DRAWINGS

Preferred embodiments of the invention are described with respect to the drawings wherein:

FIG. 1 is a perspective view of an image projection system for projecting an image onto a substrate;

FIG. 2 is a perspective view of the application of a moldable compound to the substrate to replicate the brush strokes of the original;

FIG. 3 is a perspective view of the formed male mold to be mounted on a solid backing;

FIG. 4 is a section along the section lines of FIG. 3;

FIG. 5 demonstrates pouring of a curable material from which the female mold is made;

FIG. 6 is a section through the male and female molds as contained in a molding box;

FIG. 7 is a section through the female mold;

FIG. 13 shows the movement of the vacuum box upwardly to seal against the heated thermoformable sheet with the application of vacuum to form a relief in the sheet;

FIG. 14 is a perspective view of the vacuum forming machine;

FIGS. 15A, 15B and 15C illustrate in sequence the application of heat and drawing of a vacuum on the sheet;

FIG. 16 is a top view of the sheet showing the temperatures of the sheet before the vacuum is applied in FIG. 15C;

FIG. 19 is a view of the thin plastic sheet having an image printed thereon;

FIG. 20 shows the vacuum forming a canvas relief into the printed plastic sheet of FIG. 19;

FIG. 21 is an enlarged view showing the canvas mounted on the vacuum box over which the sheet of FIG. 19 is placed in the vacuum former of FIG. 20;

DETAILED DESCRIPTION OF THE PREFERRED EMBODIMENTS

Figure 8:
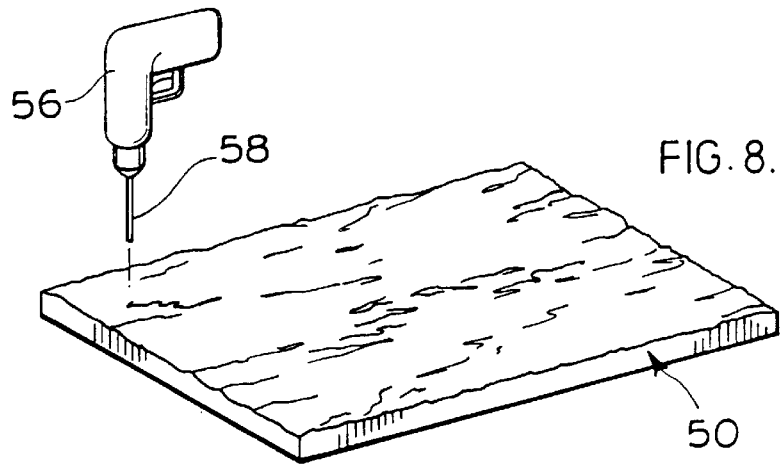
FIG. 8 illustrates the drilling of a multitude of holes in the female mold.

The vacuum forming process in accordance with this invention greatly expedites production time in producing a printed image on a plastic sheet which has formed therein an accurate three-dimensional relief reproduction of the original artwork where the relief is in register with the image. The process and apparatus of this invention may be applied in making a variety of art reproduction for use in several different fields. The conventional use is to form art reproductions which may have canvas backing, masonite backing or chipboard backing where the reproduction once framed appears to be essentially identical to the original. Such art reproduction may also be used in the apparel industry where the artwork of different shapes and sizes, as produced by this invention, can be attached to garments in the form of sheets, vests, jackets, jeans and caps. The vacuum formed material can also be laminated to sport bags, duffel bags, baseballs, footballs, soccer balls and other sport items. In the packaging industry, the vacuum formed images in accordance with this invention, may be applied to product packages such as packaged foods, fragrances, clothing and apparel packages and the like. Such packages can then have a surface texture of artwork which enhances the marketing of the product. Other fields of use for the invention include the application of the vacuum formed artwork on puzzles, paint by number artwork, board games, maps and the like.

Although techniques have been described for forming the male and female molds from the original artwork, as previously discussed, this can greatly damage the original artwork which can result in either having to dispose of the original artwork or require extensive touch ups by the artist. In accordance with an aspect of this invention, as described with respect to FIGS. 1 through 7, a female mold may be made for the vacuum forming process and apparatus which does not require contacting the original artwork with any form of molding material. As shown in FIG. 1, a substrate 10 is mounted on a solid support 12. The substrate 10, in accordance with this embodiment, comprises a canvas sheet 14 mounted on a solid backing 16. The solid backing may be masonite, chipboard or other substantially rigid planer material. A projection system 18 is spaced from the substrate 10. The image projection system includes a slide 20 which is the positive of a negative exposure of the original artwork. Such positive is developed in the normal film processing technique where the original is photographed with a camera, usually a camera using the 4 inch by 5 inch standard format. The image on the slide 20 is projected towards the substrate 10 by a projection lamp 22. The image is focused on the substrate 10 by the usual focusing lens 24 on the projector 18. The image once focused appears as a scene depicted by a mountainous topography 26 on the canvas 14. It is understood that the projection of the image may be horizontal to allow one to work on a vertical surface or the projection may be vertical to allow one to work on a horizonal surface. The objective is to now reproduce over the image and on top of the canvas the brush strokes similar to those of the original artist.

As shown in FIG. 2, the brush strokes may be replicated on the canvas by using the image 26 as a guide. A moldable compound is applied to the canvas by use of a brush 28 and/or a spatula 30. The person applying the compound has artistic ability and is able to interpret the original artwork as shown by the image to apply a surface texture on the canvas which replicates the brush strokes and sculpting of the original artist. There are several moldable compounds available to achieve this objective. For example, as supplied in the container 32 a moldable compound of acrylic polymer molding paste and/or acrylic polymer gel may be used. The operator slowly builds up on the substrate surface the moldable compound to replicate the brush strokes and sculpting. Continuous projection of the image onto the canvas surface 14 allows the operator to perfect the brush stroke replication over an extended period where the projected image acts as a guide to ensure that the strokes are properly applied to reproduce as accurately as possible the surface texture in relief of the original artwork.

To assist the artist in reproducing the brush strokes the moldable material may be opaque and of a white color to enhance and delineate the reproduced work. By using a white material the image as projected continues to show up clearly on the areas that have been covered with the compound.

As shown in FIG. 3, the completed brush stroke reproduction 34 is mounted on a solid base 36. The solid base may be three quarters of an inch plywood or other rigid material. As shown in FIG. 4, the canvas 14 has on its surface the hardened molding compound 38. In section, the relief of the hardened compound 38 replicates the brush strokes and sculpting of the original artwork. The hardened compound 38 thereby forms on the canvas backing 16, as mounted on the plywood 36, a male mold from which a female mold may be made.

As shown in FIG. 5, a frame 40 may be secured to the base 36 to provide upright sides 42 and ends 44. A curable resin 46 is then poured from a container 48 to cover the male mold 34. The resin 46 in its uncured state immediately takes on the surface relief of the male mold 34, as defined by the hardened compound 38. Sufficient resin poured from the container 48 to completely cover the male mold 34 and to a level in the framed mold to provide a female mold of a thickness in the range of ¼ inch to ¾ of an inch in thickness. The section of FIG. 6 shows the female mold 50 having a level backwall 52 and contained within the frame 40. The male mold, as provided in the frame 40, has the backing 36, the solid substrate 16 and the canvas layer 14. Preferably, the hardened compound 38 is coated with a suitable release agent to permit easy removal of the female mold 50 from the frame 40. The poured resin 46 is cured in accordance with standard practice for the selected resin. For example, a preferred resin is an epoxy resin having up to 80% by weight of aluminum as a heat conductive filler. The resin is cured by cyclical heating for 20 minutes on and then 20 minutes off. A preferred epoxy resin may be obtained from Chemque of Quebec and sold under the trademark Chemcast 402. Once the resin is properly cured to a hardened state the frame 40 is removed and the mold 50 lifted away from the male mold 34. This provides in section the female mold 50 free of the male mold and carrying on its surface indentations 54 in relief which in essence is the negative of the positive image of the original brush strokes.

Figure 10:
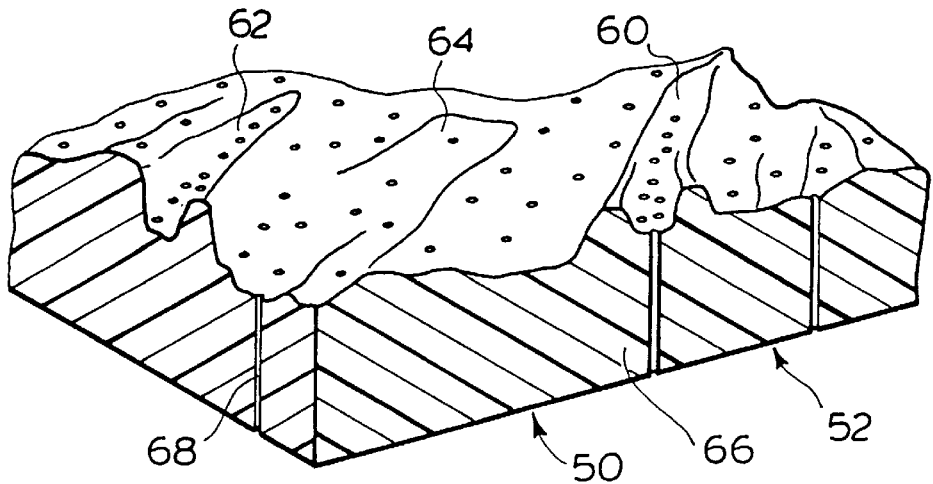
FIG. 10 is an enlarged section of the female mold showing the relative minuscule size holes provided in the relief surface.

As shown in FIG. 8, the female mold 50 has drilled through its section a multitude of minuscule holes. The holes may be formed by using a drill 56 with a drill bit 58. The drill bit is preferably of ⅟₃₂" to ⅟₆₄" in diameter or less. The number of holes drilled through the female mold 50 will vary depending upon the surface texture of the female mold. Normally the holes are drilled every ½ inch to provide in the range of 9 holes per square inch of female mold surface. Care is taken in drilling the holes considering the fragile nature thereof not to chip the mold surface and also to judiciously locate the holes in the surface in the manner shown with respect to FIG. 10. The enlarged section of the female mold 50 shows a number of cuts 60 or rifts 62 in the surface. Holes are therefore not only drilled in the more planer portions 64 but as well, careful steps are taken to ensure that the fine holes are also provided in the cuts or rifts 60 and 62. As shown in FIG. 10, the very fine minuscule holes extend through the body 66 of the female mold to the backside 52 thereof. An exemplary hole is shown through the body 66 at 68.

Figure 9:
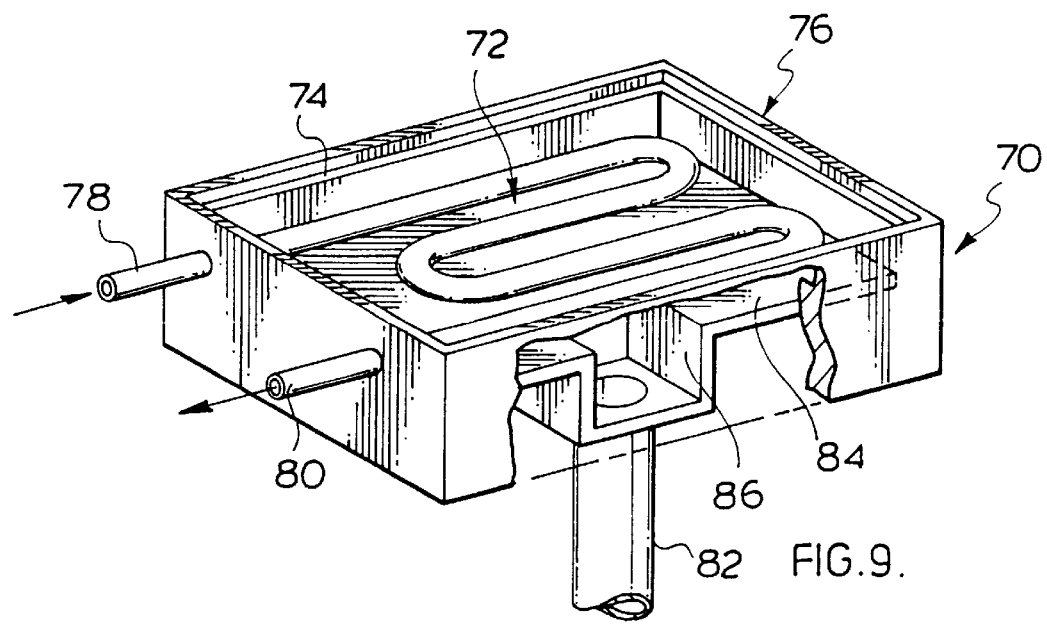
FIG. 9 is a perspective view with a portion thereof removed to illustrate details thereof.

The female mold is then of a size corresponding to the size of the artwork to be reproduced. A vacuum forming box 70, as shown in FIG. 9, is provided with a cooling coil 72. The female mold 50 is inserted in the vacuum forming box 70 and rested on the interior ledge 74 such that the uppermost surfaces of the female mold 50 are below the upper outermost perimeter edge 76 of the mold box. The cooling coil 72 has a suitable coolant introduced through inlet 78 and discharged from the coil through outlet 80. Cooling water, gaseous refrigerant or the like may be used depending upon the extent of cooling required. The cooling coil is positioned in the vacuum forming box 70 so as to be immediately beneath and preferably in contact with the underside of the female mold 50. This ensures optimum cooling of the mold as required, particularly when the mold is used on a continuous basis and in vacuum forming the art reproductions. To facilitate vacuum forming, a vacuum is drawn through conduit 82, enters a plenum beneath the female mold 50 as defined by interior partition 84. The vacuum conduit 82 is in communication with the plenum, as defined by partition 84 through an enlarged inlet 86. With the female mold 50 secured in the vacuum box 70 on top of ledge 74, a seal is provided about the perimeter of the mold 50 so that vacuum, as drawn in the plenum above partition 84 holds a vacuum on the hole 68 which are in communication with the surface of the female mold.

Figure 11:
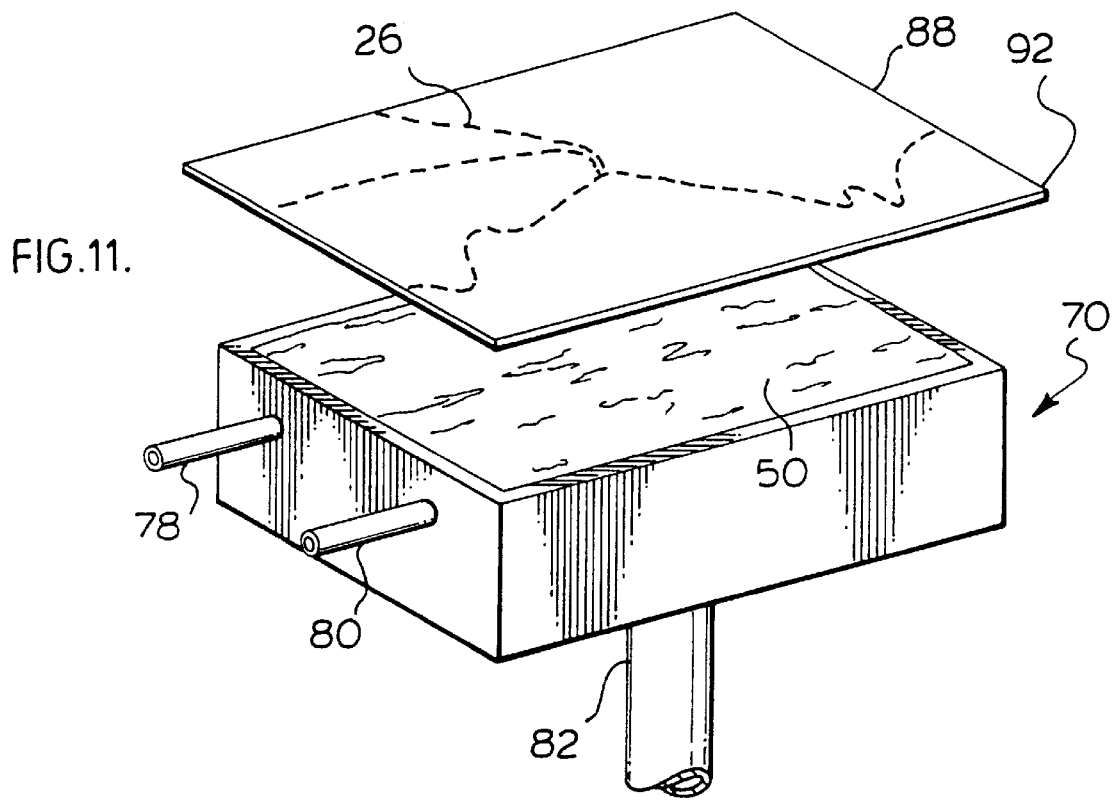
FIG. 11 is a perspective view showing the mounting of the female mold in the vacuum box of the vacuum forming machine.

The vacuum box 70, as shown in FIG. 11 is assembled and is ready to receive the thermoformable plastic sheet 88 which has an image 26 printed thereon which is identical to the image 26 projected onto the substrate 10 of FIG. 1. The objective is to now thermoform in the plastic sheet 88 the surface relief so as to replicate the brush strokes of the original. As is appreciated by those skilled in the art, there are a variety of thermoformable plastics available which may be used in the vacuum forming process. The preferred thickness of the sheets is in the range of 10 to 12 mil. Preferred plastic materials include copolymers of polyvinylchloride where the surface of the plastic sheet may be treated so as to receive the printed image and permanently retain the image on its surface. Titanium dioxide and the like may also be included in the plastic material to give the material somewhat of a paper feel as well as provide a suitable base on which printing may be applied. The printing of the sheet may be carried out in accordance with any of the well known printing techniques, where the image as printed on the sheet is essentially identical in color and definition as found in the original.

Figure 12:
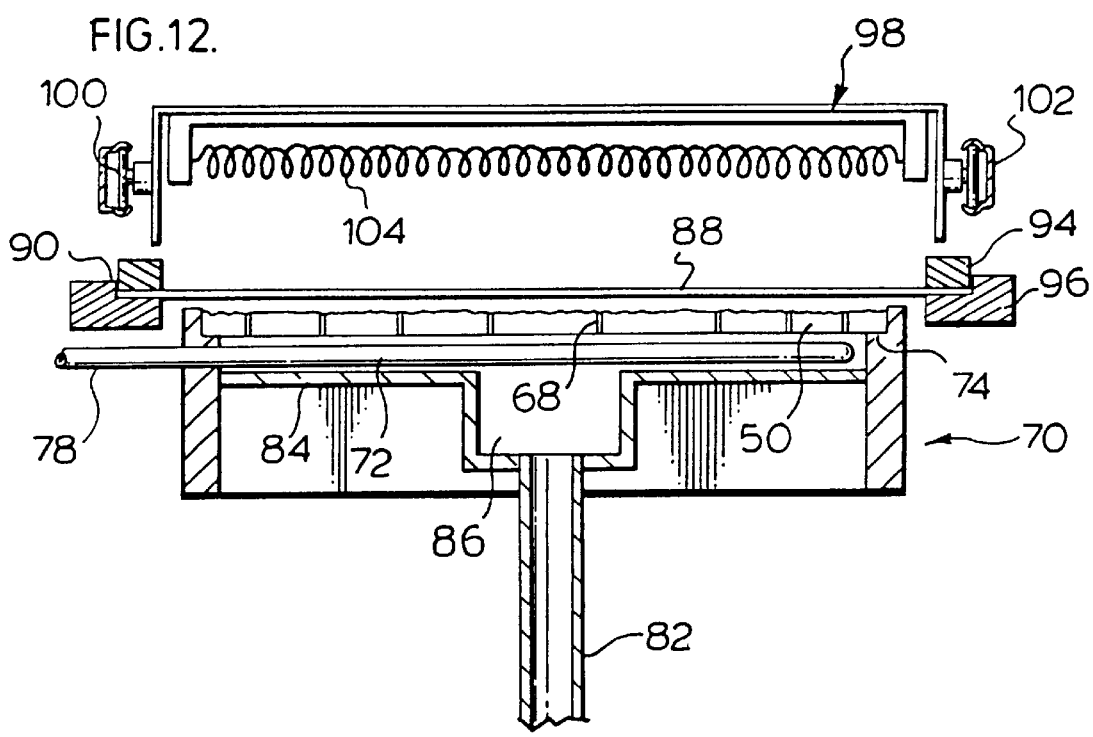
FIG. 12 is a section showing the support of the thin plastic sheet above the female mold and the relative positioning of the heating device.
Figure 17A:
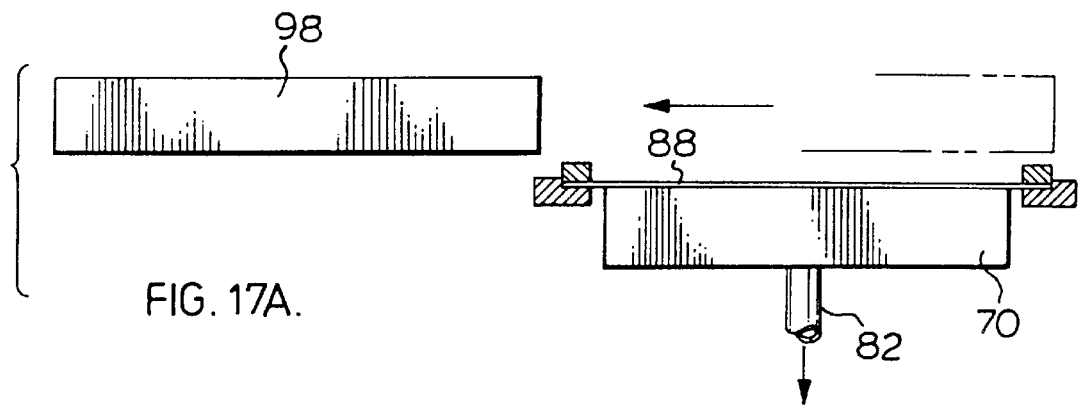
FIGS. 17A, 17B and 17C illustrate the sequence of events where heating is removed, vacuum is continued and cooling is applied to the thermoformed sheet.

The sheet 88 is positioned over the vacuum box 70 with the image 26 facing towards the female mold 50. Although it might be possible to position the sheet 88 over the female mold where the image 26 is in register with the recesses cuts and grooves in the surface of the mold, it is best to ensure registration by use of suitable guides. As shown in FIG. 12, corner guides 90 are provided at the corners and are of a spacing to correspond to the dimensional spacing of the corners 92 of the printed sheet 88. This ensures that the definition of the colored image on the sheet 88 is in register with the recesses of the female mold 50 such that when the sheet is thermoformed the relief provided on the sheet 88 is in register with the image, hence, when the thermoforming of the sheet is complete the overall effect is essentially the same as the original in replicating the brush strokes and sculpting of the original artwork.

In order to effect thermoforming of the sheet 88, it is supported slightly above the female mold 50 in the mold box 70. By slightly above it is intended that the sheet 88 is proximate the relatively cool female mold 50 but is spaced slightly therefrom to facilitate rapid heating of the sheet surface. The mold is supported by way of opposing clamp members 94 and 96. The clamp member 96 has a raised ledge portion 90 about its perimeter where the edge portion 90 is identical to the edge dimension in 92 of the plastic sheet 88. This ensures, with proper positioning of the clamp member 96, that the image on the underside of the sheet 88 is in register with the relief of the mold 50. Clamp members 94 then clamp the sheet 88 against the bottom clamp members 96.

A heating device 98 is brought over top of the sheet 88. The heating device may be mounted by way of rollers 100 on tracks 102 to allow reciprocal movement of the heating device over and away from the sheet 88. The heating device 98 may include heating elements 104 which are electrically powered to radiate the sheet 88 with infrared radiation. Such heating of the sheet is controlled in a manner in respect of the sequence of events described in reference to FIGS. 15, 16, 17 and 18. In any event, the heating of the sheet 88 does not cause it to drop onto the female mold 70 but instead to soften it to a point where it is about to droop towards or onto the mold 50.

As shown in FIG. 13, during continued heating of the sheet 88, the mold box 70 is elevated in the direction of arrow 106 where the mold box includes a raised outermost perimeter edge 76 which contacts the sheet 88 about its corresponding outer perimeter edge 88A. At this time vacuum is applied to conduit 82 to draw a vacuum on the holes 68. The sheet is at a sufficient temperature such that the vacuum pulls the sheet 88 downwardly onto the relief surface 108 of the female mold 50. Due to the contact between the upper edge of the vacuum box periphery 78 with the sheet in region 88A, a seal is formed between the vacuum box and the sheet. Hence, vacuum drawn through hole 68 draws the sheet downwardly because no air enters between the sheet and the mold face 108. While vacuum continues to be drawn, the heating device 98 remains over the sheet 88 continuing to heat it with infrared radiation 110. As will be discussed with respect to the cycle of events of FIG. 17, the heat is eventually withdrawn, vacuum maintained, cooling of the sheet effected and then release of the sheet by opening of the clamps 94 and 96 so that the sheet may be removed from the vacuum forming box.

Although it is understood that a variety of vacuum forming machines are available in which the vacuum forming box of this invention may be employed, a preferred apparatus is shown in FIG. 14. The vacuum forming apparatus 112 comprises a support base 114 on which a solid table 116 is mounted. Hydraulic cylinders 118 are used to raise and lower the solid table 116, the movement being guided by guides 120. The support for the plastic sheet is in the form of clamps 94 and 96 which are pivotally connected to a hinge mechanism at 122. The hinge mechanism 122 is secured to the base 114. The clamps are moved toward and away from one another by hydraulic cylinders 124 where the lower clamp 96 includes the lip area 90 to register the sheet 88 over the female mold 50 which is housed in the mold box 70. The interior perimeter of the clamp 96 is greater than the exterior perimeter of the mold box 70, as shown in FIG. 13. The spacing between the outermost perimeter of the mold box, as defined by edge 76 is within the inside 97 of the lower clamp 96. In operation the print is placed in the lower clamp 96 and the upper clamp 94 pressed against the lower clamp by actuation of the hydraulic cylinders 124. The heating device 98 on rails 102 is moved over top of the sheet secured in the clamps. When the sheet is heated to the desired temperature, the mold box 70 is moved upwardly within the clamp 96 by way of extension of the hydraulic cylinders 118. This effects, as previously described, the seal between the mold box and the sheet 88.

After completion of forming of the sheet 88, the heating device 98 is retracted to its first position, as shown in FIG. 14, which then clears the area such that cooling fans 126, as mounted on crossbar 128 are actuated to direct cooling air down onto the sheet 88. The sheet 88 is then cooled to the appropriate temperature to stabilize sheet integrity so that it remains flat and essentially wrap free and render the molded relief in the sheet 88 permanent. At that time clamps 94 and 96 are opened to allow removal of the sheet from the mold box 70.

Cooling of the female mold 50 is preferably conducted on a continuous basis. Refrigerant is circulated through the coil 72 to continuously cool the mold 50. Such cooling greatly decreases the cycle time of the vacuum forming machine 112 because the surface temperature of the mold 50 should be kept below the temperature to which the sheet 88 is cooled before removal from the mold. It is understood however that cooling of the mold 50 may not be required when the cycle times of the machine are greatly increased. This provides sufficient time for the mold to cool down after each cycle before heat is subsequently applied again to the sheet in the next cycle.

The cycle times for the machine are described with respect to FIGS. 15 through 18. In FIG. 15A the sheet 88 is clamped above the vacuum box 70 with the heater 98 in its first position. This is the commencement of the cycle. With the sheet 88 spaced slightly above the vacuum box 70, the heater 98 moves to its second position, as shown in FIG. 15B. Once the heater is located in its second position, this indicates the zero time of the cycle. Heat is applied to the sheet 88 until it attains a first temperature which is below normal thermoforming temperatures for the selected thermoformable plastic. Once this first temperature is attained the vacuum box 70 is moved upwardly in the direction of arrow 106 and a vacuum is drawn through conduit 82. This places the sheet 88 against the female mold in a manner described with respect to FIG. 13. The temperatures for the sheet are illustrated in FIG. 16. Thermocouples were located on the sheet to determine its surface temperature at the time when the vacuum was drawn and also to provide an average value for the first temperature. As shown in FIG. 16, the temperatures over the surface of the sheet are fairly consistent ranging from 203° F. up to 210° F. (95° C.–100° C.). The preferred range is therefore about 90° C. to 100° C. which is acceptable considering the type of heating device used as well as the space between the heating device 98 and the sheet 88. At this temperature the sheet is not considered to be at its thermoformable temperature, however, it is sufficiently pliable that when vacuum is drawn the sheet moves downwardly onto the surface of the mold. However, the sheet still has sufficient structural integrity that it does not confirm exactly to the mold surface in terms of taking on the shape of all the cuts and crevices of the mold. At this temperature the printed image on the underside of the sheet has not moved relative to the relief on the mold surface, hence the image continues to be aligned with the relief on the mold surface. As is generally understood, as the plastic is heated, normally the plastic begins to move due to irregularities in the physical properties across the sheet length and also due to the memory of the sheet with respect to strain and stress. It has therefore been discovered that in drawing a vacuum on the sheet before the image begins to move about on the sheet, registry of the image with the mold relief can be maintained and distortion in the image of the final product can be minimized or essentially eliminated.

Figure 18:
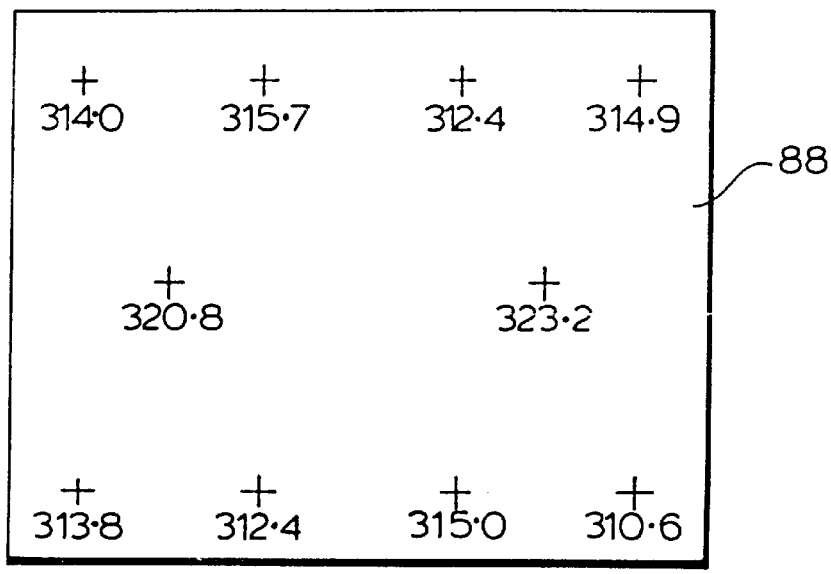
FIG. 18 is a top view showing the temperatures of the sheet at the time of removal of the heating means, as shown in FIG. 17A.

Vacuum is continued on the vacuum box 70 through the conduit 82 with the sheet 88 being against the face of the mold surface. As heating of the sheet continues its temperature is elevated to normal thermoforming temperatures which allows the sheet to then move into all of the cuts, crevices and other relief depressions in the female mold, thereby completing the formation of the desired relief in the sheet surface on the printed side. It has been found that vacuum applied to conduit 82 is within the normal range of approximately 20 pounds per square inch which provides for an external pressure on the sheet 88 equivalent to atmospheric pressure of 14.7 pounds per square inch. When the sheet has achieved a second temperature which is within the normal thermoforming temperature ranges, the heating device 98 is retracted to the first position while vacuum is maintained on the vacuum box 70. As shown in FIG. 18, the temperature of the sheet at the time of retracting of the heating device 98 is approximately in the range of 310 to 323° F. (155° C.–160° C.). Again, the discrepancies in temperatures across the sheet are due to the type of heating device used as well as the space in between the heating device and the sheet, air currents and the like which can cause regional cooling of the sheet. The preferred second temperature for the sheet is then in the range of 150° C. to 170° C. which is considered to be in the upper range of normal thermoforming temperatures for the selected polyvinylchloride copolymer sheet.

Figure 17B:
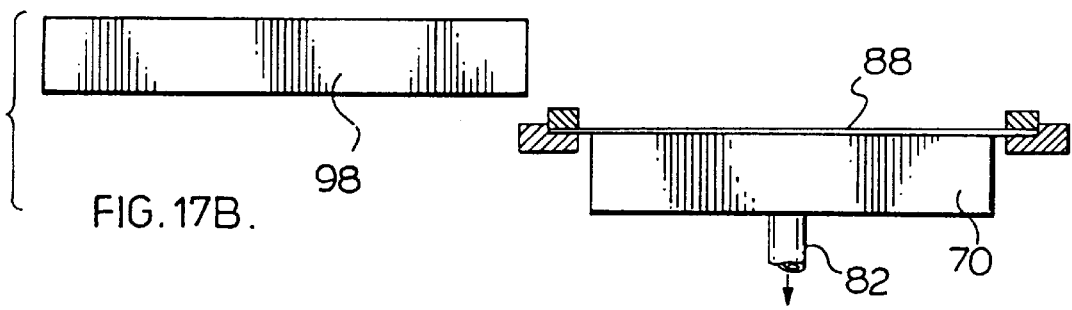
Figure 17C:
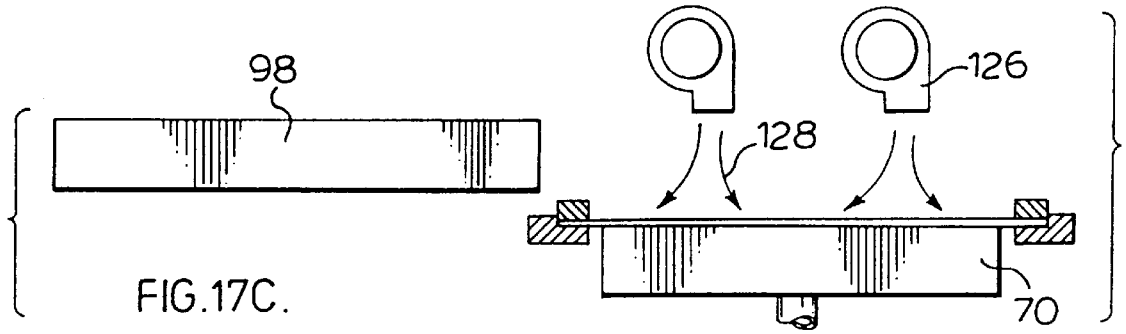

With the heating device 98 in its second position, the surface of the sheet 88 is exposed, as shown in FIGS. 17B with vacuum continued to be applied. As shown in FIG. 17C, cooling fans 126 are actuated to direct cooling air in the direction arrows 128 onto the surface of the sheet. As already noted, the vacuum box 70 includes cooling coils to ensure that the temperature of the female mold is below the third desired temperature at which the relief thermoformed in the plastic sheet becomes permanent. Preferably, the third temperature for the selected polyvinylchloride copolymer sheet is in the range of 120° F. (50° C.) or less.

It is possible to control the sequence of events for the vacuum forming machine by measuring temperature of the surface of the sheet 88. It has been found that due to the consistency in the physical characteristics of the sheet 88, it is possible to operate the vacuum forming machine 112 on the basis of cycle times. For the selected polyvinylchloride copolymer sheet, it has been found that ideal processing times for the type of heating device used is heating of the sheet to the first temperature in 10 to 12 seconds. Application of the vacuum from approximately 12 seconds to 25 seconds. The heater is then withdrawn and moved to its first position after 25 seconds from the commencement. Vacuum is continued to be applied and cooling directed onto the sheet for a further 20 to 25 seconds at which point after a total of 32 to 50 seconds, the clamps are released and the sheet is removed. Considering approximately 15 seconds setup time and locating the sheet in the machine and approximately 15 seconds for removing the sheet from the machine, a total cycle time of approximately 1 to 1.5 minutes is provided. It is appreciated though that the vacuum forming machine may be automated to further reduce the cycle time. This cycle time is considerably less than the cycle time of other plastic thermoforming machines in making artistic reproductions. Normal cycle times for most prior art machines are in the range of 5 to 6 minutes. Hence, by way of the method and apparatus of this invention, the cycle time is considerably reduced to realize a significant economy in production while continuing to produce an acceptable product for various market segments.

Although the vacuum may remain applied to the vacuum box until the end of cooling, it has been found that with most applications with PVC sheet, that the vacuum can be removed from the vacuum box at approximately 45 seconds from startup because with appropriate cooling devices, the sheet is cooled to a sufficiently reduced temperature that the relief as thermoformed in the sheet remains in its defined pattern. However, if there are difficulties in that respect it is desirable to maintain the vacuum on until the end of the cooling cycle and the temperature has reduced to an acceptable level in the range of 120° F. or less.

Figure 22:
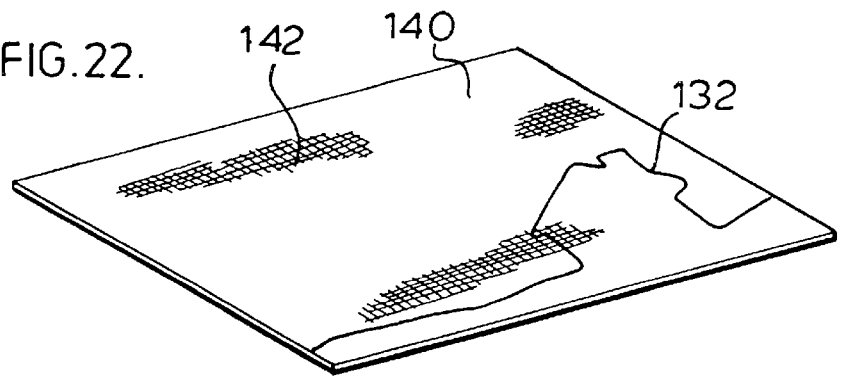
FIG. 22 shows the plastic sheet having the canvas relief thermoformed therein.
Figure 23:
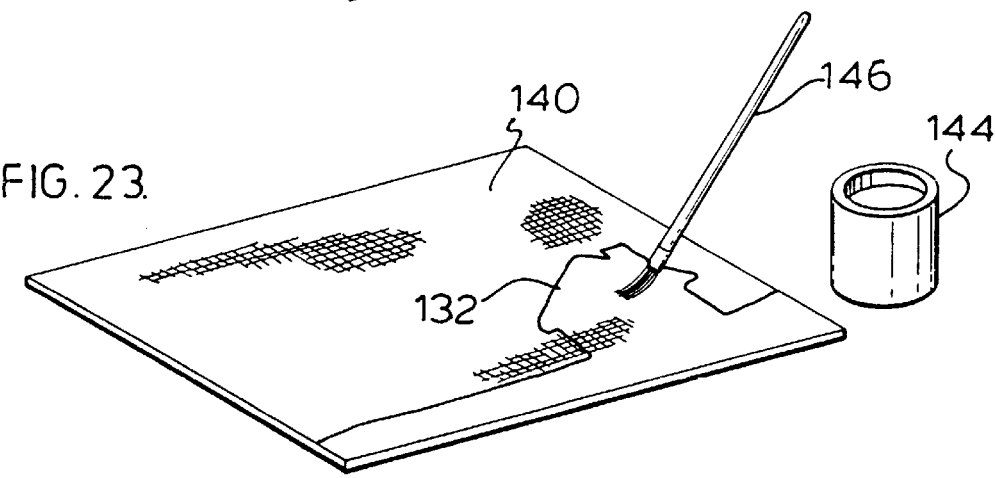
FIG. 23 illustrates the application to the sheet of FIG. 22 of a moldable compound to replicate on the surface the brush strokes of the original.
Figure 24:
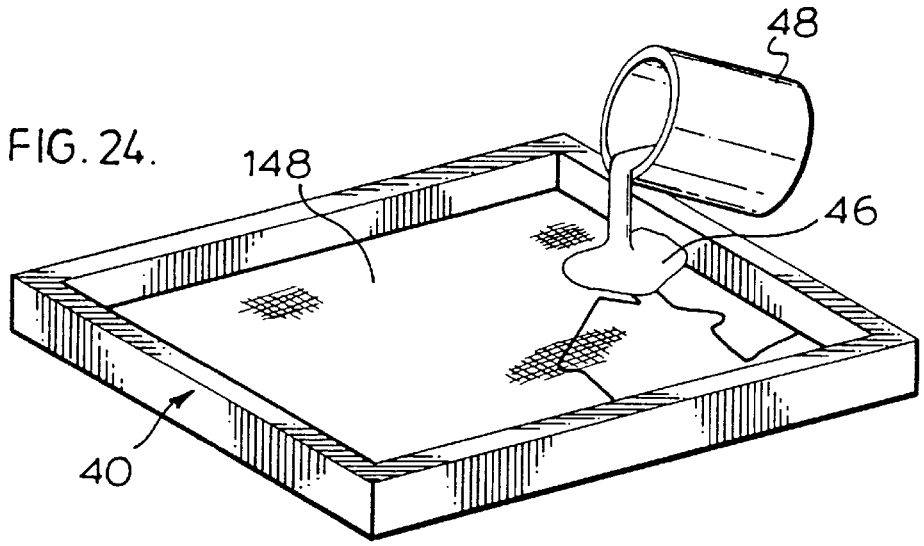
FIG. 24 illustrates the application of a curable compound for forming the female mold from the male mold of FIG. 23.
Figure 25:
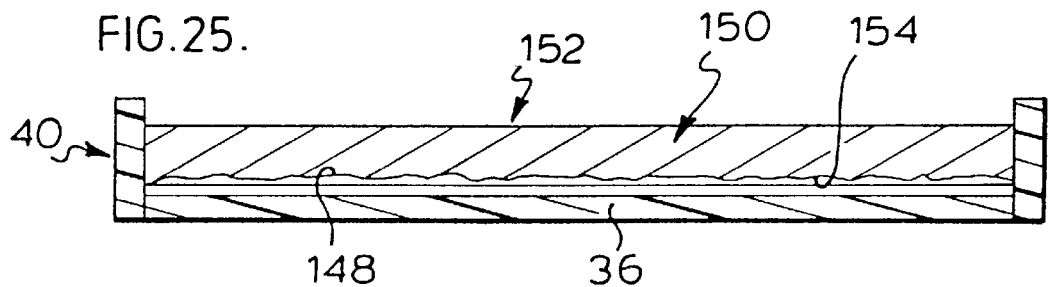
FIG. 25 is a section through the mold box of FIG. 24 with the female mold being formed on top of the male mold of FIG. 23.

As an alternative embodiment to the procedure described in respect of FIGS. 1 through 6, FIGS. 19 through 25 set out another procedure for making the male mold. As shown in FIG. 19, a plastic sheet 130 which may be of PVC material has an image 132 printed thereon. The sheet is substantially flat and smooth and in essence is the same as sheet 88 used in respect of the thermoforming process described in FIG. 11. In order to modify the sheet 130 to resemble an original piece of art, a canvas relief is formed into the surface. This is accomplished by clamping the sheet 130 in the clamps 96 and 98 above a vacuum box 70. A canvas 134 is laid over the vacuum box 70 where the perimeter edge 76 of the vacuum box elevates the edge portion 136 of the canvas sheet. With the vacuum box 70 elevated against the plastic sheet 130, the heating device 98 applies heat to the sheet 130. Vacuum is applied to the conduit 82 to draw the sheet 130 down onto the canvas 134 where a seal is formed in the region 138 as the sheet is pushed against the edge 76 with the canvas 134 sandwiched therebetween. Heating and vacuum is continued until the matrix of the canvas is formed in relief on the plastic sheet 130. The heating process is conducted in a manner to ensure that the image 132 is not distorted so that the sheet as cooled and removed from the vacuum forming mold resembles the sheet 140 as shown in FIG. 22 where a canvas matrix 142 is on the surface of the sheet having the image 132. In order to replicate the brush strokes on the thermoformed sheet 140, an artist uses a molding compound which is applied to the image in a manner to reproduce the brush strokes of the original. Preferably the molding compound as applied to the surface of the sheet 140 is clear so that the image 132 continues to be visible beneath the molding compound. A suitable molding compound which is useful in this regard is the clear acrylic polymer gel used by artists for certain acrylic artistic works. The molding compound, as supplied in container 144, is applied by a brush 146 or pallet knives, sponges, dabbing clothes or tissues as commonly employed by artists. The clear molding compound is allowed to harden and then constitute the male mold for forming the female mold. As with the first embodiment of FIG. 5 and 6, a curable resin 46 is poured onto the male mold surface 148 from the container 48. The male mold 148 is supported on a plywood backing or the like, as was done with respect to the embodiment of FIG. 3, and surrounded by a suitable frame 40. The curable resin 46 is poured into the mold box and contained by the frame 40 to a level shown in FIG. 25. The resin 46 is then cured to form a female mold body 150 having a smooth rear face 152 and a three-dimensional relief face 154 which is the female mold replica of the male mold surface 148. As with the first embodiment, the male mold surface may be treated with a release material such as a silicone. After the resin is cured to form a hard female mold body 150, the mold is broken open and the female mold released from the male mold 148. The female mold is now ready for treatment in accordance with the embodiments of FIGS. 7 and 8 before installation in the vacuum box 70. In accordance with the second embodiment for forming the female mold, a direct approach in providing the brush strokes on the surface by use of the molding compound is achieved. Assuming that the selected material for the sheet 130 is readily thermoformable, the canvas matrix is readily provided in the sheet. However, for selected materials or thicker materials which are desired in making the male mold, the first embodiment is preferable in that the artist reproduces the brush strokes directly on the canvas material.

In accordance with this invention, a consistent quality product is produced which forms a faithful reproduction of the original artistic work. Products made by the process and apparatus of this invention have many end uses as previously discussed and are not only limited to reproduction of original works which are framed.

Although preferred embodiments of the invention are described herein in detail, it will be understood by those skilled in the art that variations may be made thereto without departing from the spirit of the invention or the scope of the appended claims.

We claim:

1. An apparatus for vacuum forming a thin sheet of thermoformable plastic into an accurate three-dimensional relief reproduction of an original artwork, the sheet of plastic having printed on one side thereof a permanent image of said original artwork, said apparatus comprising:
   i) a vacuum forming female mold having a surface relief therein which is a reproduction of the surface relief of the original artwork, a multitude of vacuum forming holes being provided in said mold;
   ii) means for supporting the printed sheet of plastic proximate said mold with the printed side facing said mold, said support means supporting the image in register with said surface relief of said mold;
   iii) means for heating the plastic sheet, said heating means being mounted on means for reciprocally moving said heating means from a first position away from said mold to a second position over and spaced from the unprinted side of the plastic sheet;
   iv) means for moving the plastic sheet and said mold relative to one another to contact the plastic sheet with said mold when said heating means in said second position heats the plastic sheet to a first temperature which is below normal thermoforming temperatures;
   v) means for sealing a perimeter of the plastic sheet to a corresponding perimeter of said mold;
   vi) means for applying a vacuum to said multitude of holes in said mold when said sealing means seals the plastic sheet and the plastic sheet is at the first temperature;
   vii) said reciprocating means moving said heating means back to said second position when the plastic sheet is at a second thermoforming temperature;
   viii) means for cooling the plastic sheet with said heating means in said second position;
   ix) means for removing said vacuum from said multitude of holes when the plastic sheet is cooled by said cooling means to a third temperature, said sealing means releasing a seal between said mold and the plastic sheet to permit removal of the formed plastic sheet from the mold.

2. An apparatus of claim 1 wherein means is provided for cooling said mold to maintain said mold at a temperature below the third temperature.

3. An apparatus of claim 2 wherein a cooling coil is provided in contact with said mold beneath said surface relief.

4. An apparatus of claim 3, wherein said multitude of holes is each 1/32" in diameter or less, means enclosing said holes to provide a plenum behind said mold, said vacuum being in communication with said plenum.

5. An apparatus of claim 1 wherein said support means includes a clamp for clamping the perimeter of the plastic sheet, said perimeter of said mold being dimensionally within an inner perimeter of said clamp.

6. An apparatus of claim 5, wherein said relative movement means moves said mold toward the plastic sheet and said sealing means seals a perimeter portion of the plastic sheet within said clamp, to said corresponding perimeter of said mold.

7. An apparatus of claim 1, wherein said heating means comprises a heating element for radiant heating of the plastic sheet.

8. An apparatus of claim 1, wherein said cooling means comprises a cooling fan for directing cooling air onto the plastic sheet when said reciprocal moving means moves said heating means back to said first position.

9. An apparatus of claim 1 wherein a controller controls the timing of actuation of said reciprocal moving means, said relative movement means, said sealing means, means for applying vacuum and means for removing vacuum during the vacuum forming to mold a relief in the plastic sheet.

10. An apparatus of claim 1 wherein means is provided for registering the image with said surface relief of said mold.

* * * * *